March 6, 1934.   P. P. GREICIUS   1,950,002
SAFETY DEVICE
Filed Nov. 7, 1931
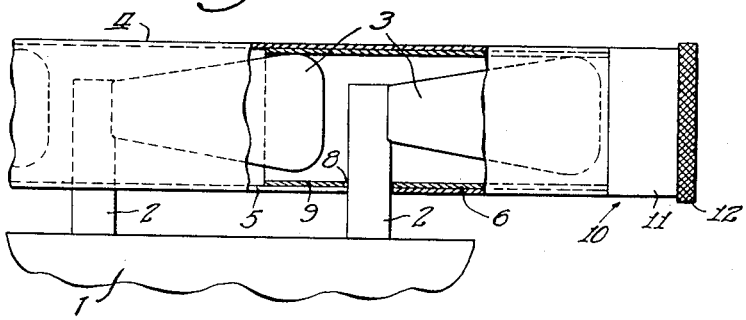
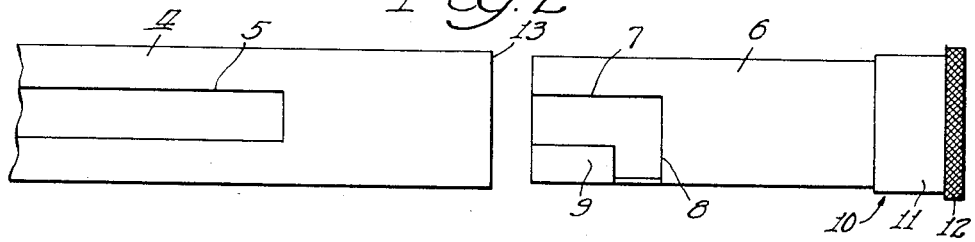
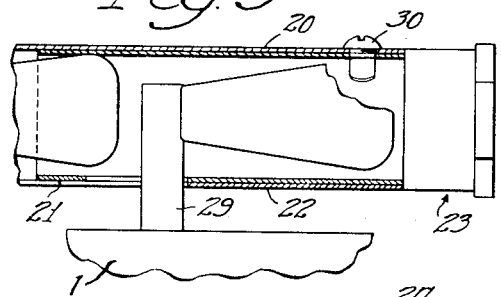
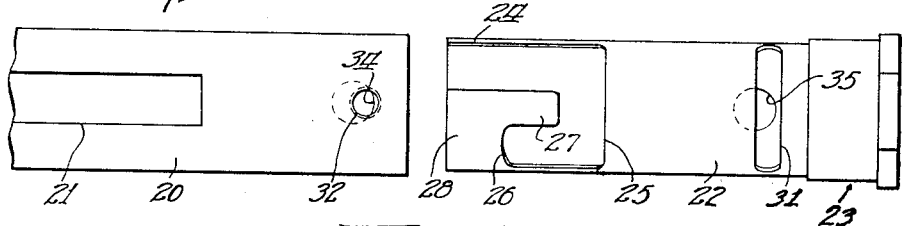
Witness
V. Dilyander
Inventor
Peter P. Greicius
By Hill & Hill
Attys.

Patented Mar. 6, 1934

1,950,002

UNITED STATES PATENT OFFICE 1,950,002

SAFETY DEVICE

Peter P. Greicius, Chicago, Ill.

Application November 7, 1931, Serial No. 573,598

12 Claims. (Cl. 126—42)

My invention relates generally to safety devices and particularly concerns one adapted to be associated with a plurality of valves and utilized to prevent the operation thereof by children, or otherwise such as by accident.

One of the important objects of my invention is to provide a device which may be easily and quickly adjusted in position with respect to the valves which are to be locked thereby.

Another object of my invention is to provide a device consisting of a guard member designed to receive the handles of a plurality of valves to confine the movement thereof, and having a member carried thereby provided with means whereby upon moving the tubular member in a certain direction, the means will receive a stem of a valve in a manner to lock the device against displacement with respect to the valves.

An object of my invention is to provide a device of simple design, and constructed of few members which may be economically manufactured.

Another object of my invention is to design and construct a device which is very durable, and which is provided with improved means for locking the device in position with respect to the valves which are to be locked thereby.

A further object of my invention is to manufacture a safety device having improved means for locking the device, said means being designed and capable of movement to a position to receive a valve operating mechanism in a manner to prevent movement of the means, which will thereby lock the device against displacement with respect to the valve operating mechanisms or valves.

An additional object of my invention is to provide a safety device of the type above referred to and which has associated therewith means for securing the guard member and member operatively related thereto, together, and which will provide means for guiding the latter member in a predetermined or prescribed manner, when moved.

A still further object of my invention is to construct a device of the character described, in which the guard member and member operatively related thereto are each provided with an aperture arranged so as to provide an opening through which locking means independent of the device may be inserted.

Obviously, many other objects and advantages of my invention will be evident after considering the complete specification.

To this end my invention consists in the novel construction, arrangement and combination of parts herein shown and described and more particularly pointed out in the claims appearing at the close of the specification.

In the drawing annexed hereto and in which the several members or elements comprising the device are clearly illustrated, Fig. 1 is a view in elevation partly in section depicting the manner in which the device is utilized;

Fig. 2 illustrates a bottom plan view of the device disassembled so as to disclose the details of construction concerning each element;

Fig. 3 is a view depicting a modified embodiment to which the invention is susceptible, and the manner in which it is utilized; and Fig. 4 is a detailed bottom plan view disclosing the constructional details concerning the elements of the embodiment disclosed in Fig. 3.

As above referred to, an important object of my invention is to design and construct a safety device which is adapted for association with a plurality of valves so as to prevent children from, in any way, interfering with their operation; and otherwise prevents operation or displacement of the valves.

The device is of novel design and construction and can be easily and quickly adjusted in position with respect to the valves which are to be locked thereby. As previously mentioned, the device preferably consists of a guard member designed to receive a plurality of valve operating mechanisms to confine the movement thereof, and has means operatively related thereto which is designed to receive or engage one of a plurality of valve operating mechanisms in a manner to lock the device against displacement with respect thereto, or the valves which are to be confined or locked thereby.

With reference to Figs. 1 and 2, of the drawing, in which the several members or elements comprising one embodiment to which my invention is susceptible are shown, and which along with other elements are designated by numerals, it will be evident that numeral 1 indicates a gas supply pipe or conduit to which is associated a plurality of valves (not shown) having valve stems 2, and handles 3 which may be secured or connected in any suitable manner to said stems. Obviously, the device may be constructed of any suitable material, and applied to valves with valve operating mechanisms of a character other than the particular type illustrated. It will be apparent that either the valve stems, or handles may be generally referred to as valve operating mechanisms. The guard member is designated 4, and is provided with a slot 5 which extends a distance along one side thereof, and provides means for receiving the valve operating mechanisms.

The member which is operatively related to the guard member and which is designed to receive or engage one of a plurality of valve operating mechanisms in a manner to lock the device against displacement is designated 6. Member 6 is preferably of tubular construction and is designed to snugly fit into, or otherwise enter into frictional engagement with the guard member 4. Adjacent one end of tubular member 6, is a bayonet slot consisting of a slot 7 and a slot 8, which arrangement provides a projection or catch 9. The width of slot 7, slot 8 provided in member 6, and the width of slot 5 provided in guard member 4 correspond, and are of a size to receive a plurality of valve operating mechanisms. Provided adjacent one end of the tubular member 6 is an end piece generally designated 10 which provides a collar 11, and a thumb part 12 which may be knurled if desired. Obviously, the end piece generally designated 10 may be formed integral or otherwise with the tubular member 6. It will be noted in view of the drawing that the distance between slot 5 and end 13 of guard member 4, and the distance between slot 8, and collar 11 of tubular member 6 substantially correspond; the object of which is to align and arrange the several slots in a position whereby they register and may properly receive the valve operating mechanisms or valve stems 2 in the manner intended. To renew the snugness of fit or frictional engagement between the guard member 4 and tubular member 6, the projection or catch 9 formed on tubular member 6 may be bent outwardly a certain extent.

As previously referred to the device is designed and constructed in a manner whereby the same may be easily and quickly adjusted in position, and it will be evident from the foregoing description that to utilize the device, the same is slipped or positioned over a plurality of valve operating mechanisms or handles 3, and the tubular member 6 is moved with respect to the guard member a distance to cause the slot 8 to receive one of the valve operating mechanisms, or valve stems 2, to lock the device in position with respect to the valves; the projection or catch 9 being arranged to prevent displacement of the device.

A modified arrangement of construction to which the invention is susceptible is clearly shown in Figs. 3 and 4, and upon consideration thereof, it will be evident that it is designed and constructed to include substantially the same principles of construction embodied in the device described above, and shown in Figs. 1 and 2, with the exceptions, that improved means are provided for locking the safety device in position, that means are provided for securing the members of the device together in a manner whereby one is guided in its movement with respect to the other, and that the device is designed to receive independent locking means.

Considering the details concerning the construction of this embodiment, it will be apparent that the guard member 20 is provided with a longitudinal slot 21. It will also be evident that a tubular member 22 is operatively related to guard member 20. Tubular member 22 is provided with an end piece generally designated 23, which may be of any convenient size and shape desired. The end piece whether formed separate or as a portion integral with member 22 is preferably provided with an aperture. A bayonet slot arrangement is provided adjacent one end of tubular member 22, and consists of a slot 24, a slot 25, and a slot 26, the width of each slot corresponding to the width of slot 21 provided in guard member 20. As clearly shown, the arrangement of slots provides a catch 27 in the portion 28 of tubular member 22. Catch 27 provides means which will prevent operation or rotation of member 22 with respect to the guard member 20, providing the device is adjusted to a position whereby the slot 26 will receive a valve operating mechanism or stem 29 of a valve.

The means employed for securing the members of the device together in a manner whereby one member is guided in its movement with respect to the other is of novel character, and as clearly shown, is accomplished by the provision of a small bolt 30, or the equivalent, on guard member 20 in a position for movement within a transverse slot 31 provided in member 22. A threaded aperture 32 is provided in guard member 20 for receiving bolt 30, and as clearly shown a portion of the bolt is adapted to extend into slot 31. It will be evident from the disclosure that slot 31 and slot 25 are of substantially the same length. By the provision of the arrangement shown it will be evident that the same is an improvement, and provides means which assists in guiding member 22 with respect to guard member 20 in a manner whereby the various slots such as 24, 25, and 26 may be properly aligned so as to receive a valve operating mechanism, such as a valve stem. If desired apertures such as 34 and 35 may be respectively provided in guard member 20 and member 22, so as to provide means through which independent locking means such as the arm of a padlock, may be inserted for locking the safety device against displacement with respect to the valves. Obviously, apertures 34 and 35 may be positioned at any suitable location, and if in the particular location shown, it will of course, be necessary that end piece generally designated 23 is provided with an aperture which will permit the entrance of a padlock arm.

Obviously the embodiment first described, and disclosed in Fig. 1 and 2, may include any of features of constructional details employed in the device last described and that the application of either device is substantially the same.

It will be evident from the foregoing description, in view of the drawings, that my invention contemplates the utilization of a device which consists of a guard member designed to receive a plurality of valve operating mechanisms to confine the movement thereof, and that a member operatively related to the guard member is provided with means whereby upon moving the member in a certain direction, the said means will receive a valve operating mechanism in a manner to lock the device against displacement with respect to the valves to be locked thereby.

It will also be evident that the safety device may be easily and quickly adjusted and locked in position; is of novel design, construction, and may be economically manufactured and assembled.

It will further be evident that the objects to be attained and set forth above, have been accomplished by the arrangement or combination of elements or members shown and described. It may be mentioned that the device may be constructed from any suitable material, and be finished if desired.

Having thus described my invention, it is ob- vious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a safety device of the kind described, a tubular guard member designed to be slid over and receive one or more valve operating mechanisms to confine the movement thereof, and means rotatably connected to said guard member for locking the device against displacement with respect to said valve operating mechanisms.

2. In a safety device of the kind described, a tubular guard member designed to receive a plurality of valve operating mechanisms to confine the movement thereof, and means rotatably connected to said guard member designed to engage one of said valve operating mechanisms in a manner to lock the device against displacement.

3. In a safety device of the kind described, a tubular guard member provided with a slot so as to receive a plurality of valve operating mechanisms to confine the movement thereof, and a catch member rotatable within said guard member and provided with a slot for receiving one of said valve operating mechanisms in a manner to lock the device against displacement.

4. In a safety device of the kind described, a guard member designed to be slid over and receive the handles of a plurality of valves to confine the movement thereof, and a tubular member carried by said guard member and provided with means whereby upon moving said tubular member in a direction transverse to the axis of said guard member said means will receive a stem of a valve in a manner to lock the device against displacement with respect to the valves.

5. In a safety device of the kind described, a guard member designed to receive a plurality of valve operating mechanisms to confine the movement thereof, a member rotatably connected to said guard member and engageable with one of said valve operating mechanisms for locking the device against displacement with respect to said valve operating mechanisms, and means provided for securing the members together whereby one is guided in its movement with respect to the other to facilitate the proper engagement of said member with one of said valve operating mechanisms.

6. In a safety device of the kind described, a tubular guard member designed to receive a plurality of valve operating mechanisms to confine the movement thereof, a tubular catch member rotatably related to said guard member and designed to receive one of said valve operating mechanisms in a manner to lock the device against displacement, means for guiding the movement of said catch member with respect to said guard member, and apertures formed in said members to provide means through which independent locking means may be inserted.

7. In a safety device of the kind described, a tubular guard member provided with a slot so as to receive a plurality of valve operating mechanisms to confine the movement thereof, a catch member operatively related to said guard member and provided with a slot adapted to cross said first mentioned slot and receive one of said valve operating mechanisms in a manner to lock the device against displacement, and means provided for securing said members together whereby one is guided to predetermined positions with respect to the other.

8. In a safety device of the kind described, a tubular guard member designed to be slid over and receive the handles of a plurality of valves to confine the movement thereof, a catch member slidably and rotatably related to said guard member designed to receive a stem of a valve in a manner to lock the device against displacement with respect to the valves, and means provided for locking said catch member against movement with respect to said guard member after said device has been locked against displacement.

9. In a safety device of the kind described, a tubular guard member designed to be slid over and receive the handles of a plurality of valves to confine the movement thereof, a catch member rotatably carried by said guard member and provided with means designed to receive a stem of a valve in a manner to lock said catch member against movement with respect to said guard member and also lock the device against displacement with respect to the valves, means provided for securing said members together whereby the rotation of said catch member is limited and guided to predetermined positions with respect to said guard member, and apertures formed in said members to provide means through which independent locking means may be inserted.

10. In a safety device of the kind described, a tubular guard member provided with a slot so as to receive a plurality of valve operating mechanisms to confine the movement thereof, a catch member operatively related to said guard member and provided with a slot adapted to cross said first-mentioned slot and receive one of said valve operating mechanisms in a manner to lock the device against displacement when said catch member is rotated.

11. In a safety device of the kind described, a tubular member designed to be slid over and receive a plurality of valve operating mechanisms to confine the movement thereof, and said tubular member being provided with a slot in the wall thereof of a character to receive and engage one of said valve operating mechanisms in a manner to hold the device with respect to said mechanisms when said member is rotated.

12. In a device of the kind described, a tubular member provided with a longitudinal slot so as to receive a plurality of valve operating mechanisms and confine the movement thereof and said tubular member being provided with a slot arranged at an angle to and connecting with said longitudinal slot of a character to receive and engage one of said valve operating mechanisms in a manner to hold the device with respect to said mechanisms when said member is rotated.

PETER P. GREICIUS.